United States Patent
Yoon et al.

(10) Patent No.: US 8,245,908 B2
(45) Date of Patent: Aug. 21, 2012

(54) TEACHING METHOD OF TRANSMISSION CONTROL UNIT OF VEHICLE

(75) Inventors: Youngmin Yoon, Hwaseong-si (KR); Chanhee Won, Hwaseong-si (KR); Saepoong Oh, Hwaseong-si (KR); Seonghwan Cheong, Ansan-si (KR); Donghyun Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 350 days.

(21) Appl. No.: 12/622,228

(22) Filed: Nov. 19, 2009

(65) Prior Publication Data

US 2011/0062228 A1    Mar. 17, 2011

(30) Foreign Application Priority Data

Sep. 16, 2009    (KR) .................... 10-2009-0087419

(51) Int. Cl.
*G06F 17/00* (2006.01)
(52) U.S. Cl. ........................ 235/375; 235/384
(58) Field of Classification Search .................. 235/375, 235/462.01, 384
See application file for complete search history.

(56) References Cited

U.S. PATENT DOCUMENTS

| | | | |
|---|---|---|---|
| 6,602,161 B2 * | 8/2003 | Hemmingsen et al. | 477/79 |
| 7,258,648 B2 | 8/2007 | Smith et al. | |
| 2006/0099740 A1 * | 5/2006 | Doan | 438/123 |
| 2006/0229788 A1 | 10/2006 | Miyake et al. | |
| 2008/0059006 A1 * | 3/2008 | Palansky et al. | 701/1 |

FOREIGN PATENT DOCUMENTS

| | | |
|---|---|---|
| JP | 10-78375 A | 3/1998 |
| JP | 2003-14119 A | 1/2003 |
| JP | 2004-132808 A | 4/2004 |
| JP | 2008-69946 A | 3/2008 |
| KR | 2000-0071275 A | 11/2000 |
| KR | 10-2005-0042672 A | 5/2005 |
| KR | 10-2006-0097551 | 9/2006 |

* cited by examiner

*Primary Examiner* — Ahshik Kim
(74) *Attorney, Agent, or Firm* — Morgan, Lewis & Bockius LLP

(57) ABSTRACT

A teaching method of a transmission control unit (TCU) allows one to transmit specific property data of a transmission manufactured in a transmission production line to a vehicle assembly line where the TCU and the transmission are assembled, and input the data to the TCU in a very inexpensive and simple fashion. The method also allows the TCU that controls a CVT to appropriately initialize kiss-point pressure of the CVT that uses a wet-type multi-disc clutch, instead of a torque converter, and is equipped with a solenoid valve directly controlling the wet-type multi-disc clutch, such that it makes it possible to allow the TCU to stably and appropriately control the CVT to be controlled, with the property data about the CVT which is restrictively transmitted.

4 Claims, 2 Drawing Sheets

TEACHING METHOD OF TRANSMISSION CONTROL UNIT OF VEHICLE

CROSS-REFERENCE TO RELATED APPLICATION

The present application claims priority of Korean Patent Application Number 10-2009-0087419 filed Sep. 16, 2009, the entire contents of which application is incorporated herein for all purposes by this reference.

BACKGROUND OF THE INVENTION

1. Field of the Invention

The present invention relates a teaching method of a transmission control unit (TCU), in detail, a technology for initializing a TCU controlling a transmission equipped in a vehicle.

2. Description of Related Art

In transmission equipped vehicles, a transmission control unit (TCU) that is an electronic controller for controlling transmission that are electronically controlled are equipped in vehicles together with the transmissions.

The transmissions are manufactured in the transmission production line, and after they are completed, various property data of the transmissions is measured by FINAL TESTER in the transmission production line.

On the other hand, the TCUs are manufactured in another TCU production line and are assembled with vehicles in the vehicle assembly line together with the transmissions manufactured as described above.

The TCUs can correctly control the transmissions when the various specific property data of the transmission equipped in the vehicles is inputted, however, since the property data of the transmissions are measured in the transmission production line, it is required to transmit the data measured in the transmission production line to the vehicle assembly line where the transmission and the TUC are equipped in the vehicles and input correct data of corresponding transmissions into TCUs.

It is called 'teaching' to input and initialize property data of a transmission to be controlled to a TCU.

A typical method of transmitting specific data of a corresponding transmission which is measured in the transmission production line to the vehicle assembly line where the TCU is equipped in the related art is to input the data measured in the transmission production line to a barcode and attach it to the corresponding transmission, and then scan the barcode in the vehicle assembly line to ensure the data to input to the TCU. However, the barcode is classified into a one-dimensional barcode and a two-dimensional barcode, in which the one-dimensional barcode can transmit a very small amount of data and the two-dimensional barcode can store relatively a large amount of data, such that the two-dimensional barcode is suitable to transmit various property data of transmissions.

However, the two-dimensional barcode is more expensive than the one-dimensional barcode, the scanning device is also relatively expensive, and it is relatively difficult to perform the scanning operation.

On the other hand, in the transmissions, a kiss-point is one of important specific properties of transmissions which are CVT (Continuously Variable Transmission) that is equipped with a wet-type multi-disc clutch therein instead of a torque converter and directly controls the wet-type multi-disc clutch with a solenoid valve.

The kiss-point implies a state in which start-slip control is ready to be started by applying hydraulic pressure to a position where frictional force of the clutch of a wet-type multi-disc clutch starts to be generated, and in detail, hydraulic pressure that generates the power transmission start state is called kiss-point pressure.

In the transmissions having the above structure, the kiss-point pressure changes for each transmission by return spring tolerance, clutch clearance difference, pressure sensor tolerance, solenoid valve tolerance, and leaking oil difference of other sealed portions of the wet-type multi-disc clutch. If the kiss-point pressure is larger than a designed value, the engine may by stopped by excessive clutch pressure in shifting from the N-range to the D-range, and when the kiss-point pressure is smaller than the designed value, the response is delayed when the vehicle starts. Therefore, the kiss-point pressure is a very important specific property of transmissions and also data that should be transmitted and inputted to TCUs.

In the CVT having the above structure, the kiss-point pressure is determined by electric current provided from the solenoid, such that the electric current that should be provided from the solenoid valve to create the kiss-point pressure is called kiss-point electric current.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a teaching method of a transmission control unit (TCU) of a vehicle that makes it possible to transmit specific property data of a transmission manufactured in a transmission production line to a vehicle assembly line where a TCU and the transmission are assembled, and input it to the TCU, in very inexpensive and simple method, allows the TCU that controls the CVT to appropriately initialize kiss-point pressure of the CVT that uses a wet-type multi-disc clutch, instead of a torque converter, and is equipped with a solenoid valve directly controlling the wet-type multi-disc clutch.

A teaching method of TCU of a vehicle according to the present invention may include measuring specific property data of a transmission, inputting the measured specific property data to a one-dimensional barcode, attaching the one-dimensional barcode to the transmission, and/or scanning and inputting the specific property data in the one-dimensional barcode to a TCU in a vehicle assembly line, in which identity data for recognizing a corresponding transmission is stored in the one-dimensional barcode, and in the inputting of the specific property data of the transmission to the one-dimensional barcode, the identity data of the transmission is inputted in the one-dimensional barcode and the specific property data of the transmission is inputted in the remaining storage space.

The present invention makes it possible to transmit specific property data of a transmission manufactured in a transmission production line to a vehicle assembly line where a TCU and the transmission are assembled, and input it to the TCU, in very inexpensive and simple method, allows the TCU that controls the CVT to appropriately initialize kiss-point pressure of the CVT that uses a wet-type multi-disc clutch, instead of a torque converter, and is equipped with a solenoid valve directly controlling the wet-type multi-disc clutch, such that it makes it possible to allow the TCU to stably and appropriately control the CVT to be controlled, with the property data about the CVT which is restrictively transmitted.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
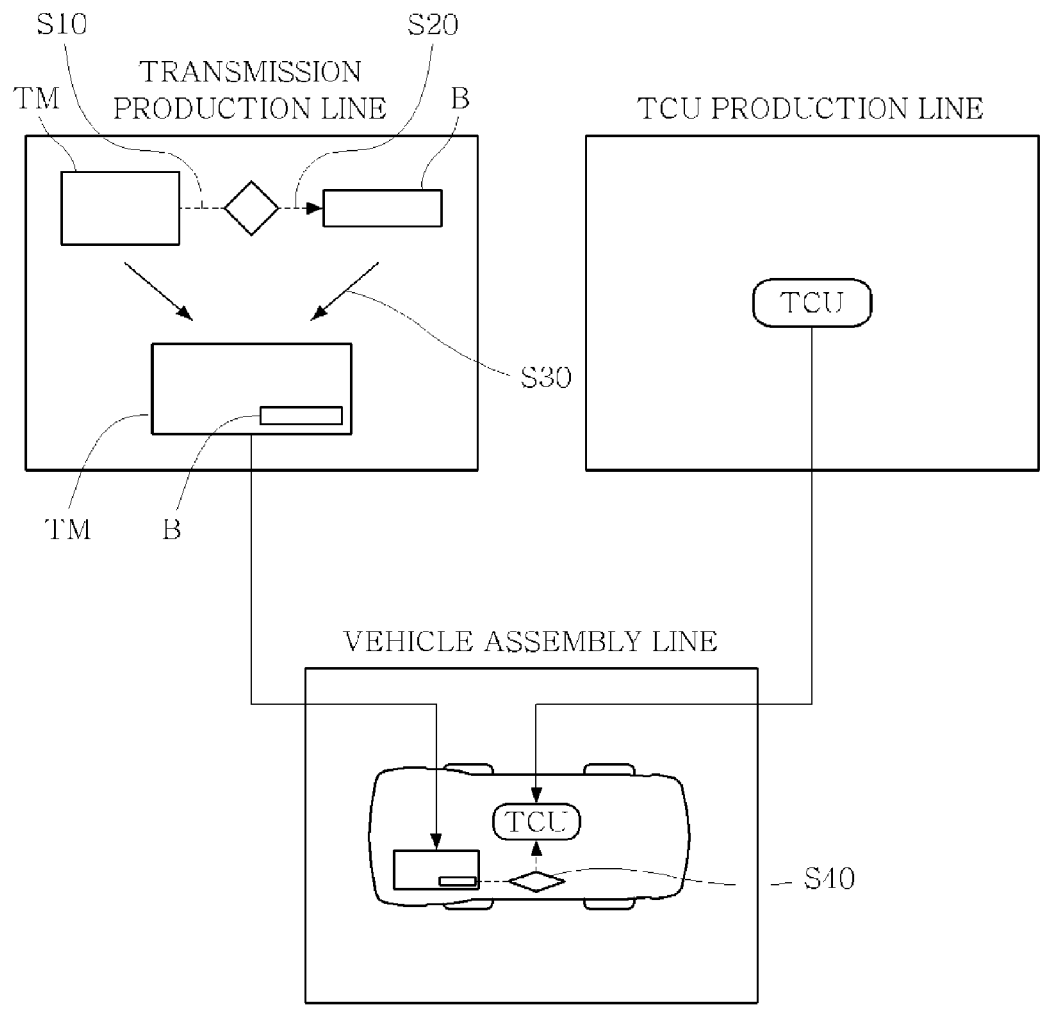
FIG. 1 is a view illustrating a teaching method of a transmission control unit (TCU) of a vehicle according to the present invention.

Referring to FIG. 1, various embodiments of the present invention include measuring specific property data of a transmission TM (S10), inputting the measured specific property data to a one-dimensional barcode B (S20), attaching the one-dimensional barcode B to the transmission (S30), and/or scanning and inputting the specific property data in the one-dimensional barcode to a transmission control unit (TCU) in a vehicle assembly line (S40).

In particular, identity data for recognizing a corresponding transmission is stored in the one-dimensional barcode B, and in S20 where the specific property data of the transmission is inputted to the one-dimensional barcode B, the identity data of the transmission is inputted in the one-dimensional barcode B and the specific property data of the transmission is inputted in the remaining storage space.

This makes it possible to additionally input the specific property data of the transmission into the remaining storage space of the one-dimensional barcode B storing the identity data of the related art which should be attached for recognizing the transmission, and to transmit the data to the vehicle assembly line, such that it is possible to transmit the specific property data of the transmission measured in the transmission production line to the vehicle assembly line, by using a relatively inexpensive and simple method without attaching a special barcode or using a two-dimensional barcode.

It should be understood that the remaining storage space of the one-dimensional barcode B storing the identity data of the transmission TM is very small, such that it is difficult to store all the measured specific property data of the transmission. Therefore, important and necessary data of the measured specific property data of the transmission is only selectively inputted to the one-dimensional barcode B, and in the TCU, as described below, the data transmitted from the one-dimensional barcode B is reproduced to use and initialization is performed as similar as possible to that all the measured specific property data of the transmission is transmitted.

In various embodiments, the transmission is a CVT that uses a wet-type multi-disc clutch, instead of a torque converter, and is equipped with a solenoid valve directly controlling the wet-type multi-disc clutch. Further, the specific property data of the transmission that is inputted to the one-dimensional barcode B is measured kiss-point pressure $P_0$ and measured kiss-point electric current $I_0$ of the CVT.

The measured kiss-point pressure $P_0$ and measured kiss-point electric current $I_0$ are composed of a pair of measured kiss-point pressure and measured kiss-point electric current at the D-range of the CVT and a pair of measured kiss-point pressure and measured kiss-point electric current at the R-range of the CVT.

Therefore, only two pairs of data of measured kiss-point pressure and measured kiss-point electric current at the D-range and the R-range are inputted to the one-dimensional barcode B storing the identity data of the transmission TM.

As described above, since the remaining storage space of the one-dimensional barcode B storing the identity data of the transmission is very restricted, it is possible to provide the measured specific property data of the transmission to the TCU using a relatively inexpensive and simple method, by additionally inputting only the two pairs data to be transmitted to the vehicle assembly line.

Reference data about the relationship between the electric current provided to the solenoid valve of the regulated CVT and corresponding pressure exerted in the wet-type multi-disc clutch is inputted in the TCU.

The term 'regulated CVT' implies a CVT that is determined to be the most representative by experiments and analysis from the same models of CVT, in which the reference data is a standard data about how much pressure is exerted in the wet-type multi-disc clutch, when a predetermined amount of electric current is applied to the solenoid valve in the standard CVT. For reference, in FIG. 2, the functional relationship between the electric current and pressure of the standard data is expressed by $f_n$.

The TCU obtains the final kiss-point pressure $P_{kp}$ and the final kiss-point electric current $I_{kp}$ that are used for controlling the CVT to be controlled, by comparing the measured kiss-point pressure $P_0$ and the measured kiss-point electric current $I_0$, which are received from the one-dimensional barcode B, with the standard data of the regulated CVT.

That is, since the final kiss-point pressure $P_{kp}$ and the final kiss-point electric current $I_{kp}$ that are used for controlling the CVT, which will be actually controlled, are obtained by appropriately processing the measured kiss-point pressure $P_0$ and the measured kiss-point electric current $I_0$, which are the specific property data of the corresponding transmission restrictively transmitted from the one-dimensional barcode B, it is possible to supplement the reliability of the insufficient data.

Figure 2:
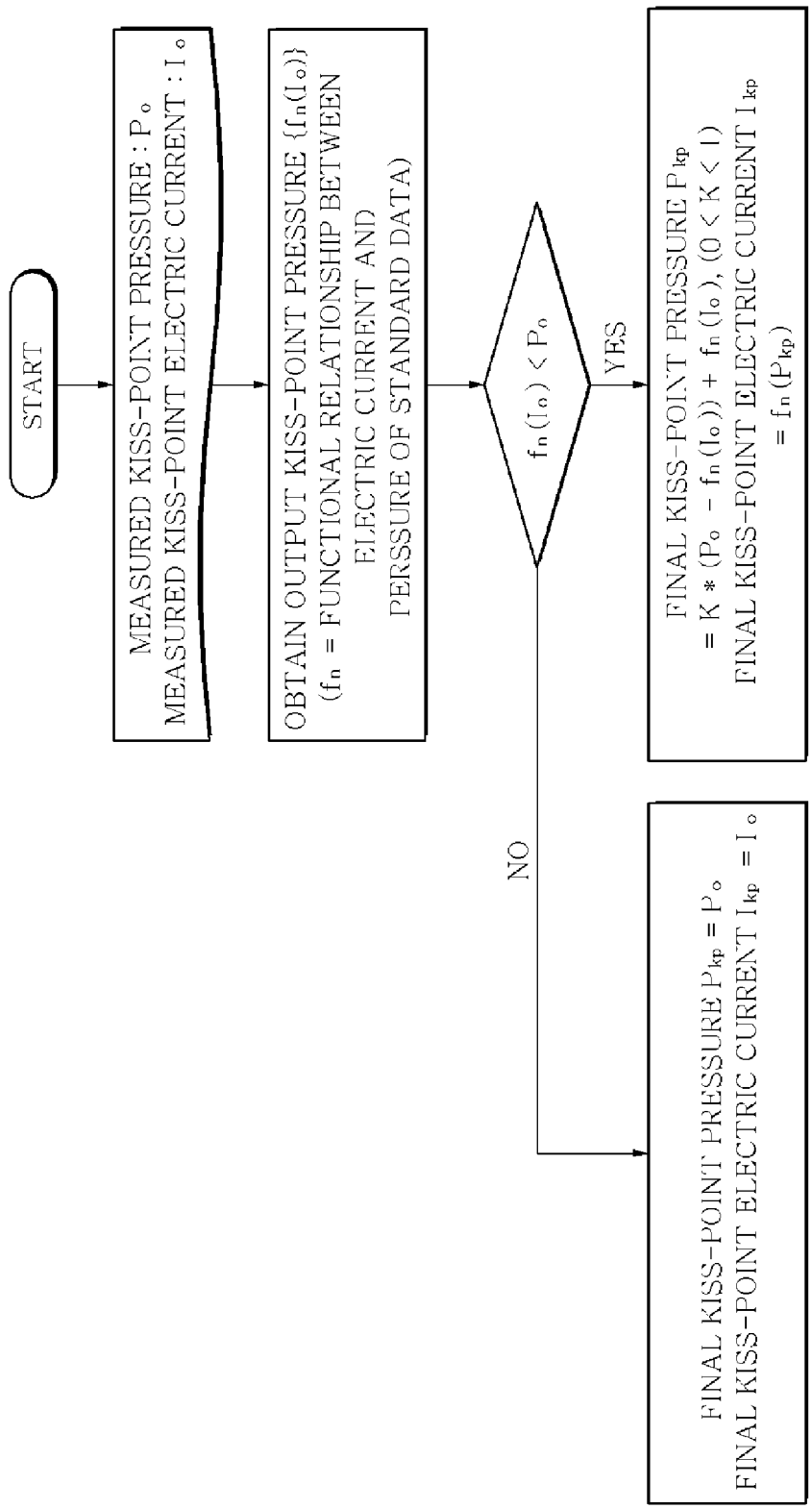
FIG. 2 is a flowchart illustrating the teaching method of a TCU of a vehicle according to the present invention, in which exemplary processing data transmitted to a TCU is illustrated.

Referring to FIG. 2, in various embodiments of the present invention, the TCU calculates output kiss-point pressure $f_n(I_0)$ corresponding to the measured kiss-point electric current using the standard data, determines, as the final kiss-point pressure $P_{kp}$ of a CVT to be controlled, a value obtained by multiplying the difference between the measured kiss-point pressure $P_0$ and the output kiss-point pressure $f_n(I_0)$ by a reduction coefficient k, which is smaller than 1, and adding the value to the output kiss-point pressure $f_n(I_0)$, when the output kiss-point pressure $f_n(I_0)$ is smaller than the measured kiss-point pressure $P_0$, determines the output kiss-point electric current $f_n(P_{kp})$ corresponding to the final kiss-point pressure as the final kiss-point electric current $I_{kp}$, using the standard data, and determines the measured kiss-point pressure $P_0$ as the final kiss-point pressure $P_{kp}$ and the measured kiss-point electric current $I_0$ as the final kiss-point electric current $I_{kp}$, when the output kiss-point pressure $f_n(I_0)$ is larger than the measured kiss-point pressure $P_0$.

That is, the TCU finds kiss-point pressure corresponding to the inputted measured kiss-point electric current $I_0$ from the standard data and determines the found pressure as the output kiss-point pressure $f_n(I_0)$, and calculates the final kiss-point pressure $P_{kp}$ and the final kiss-point electric current $I_{kp}$ in different ways, in accordance with whether the output kiss-point pressure $f_n(I_0)$ is smaller or larger than the measured kiss-point pressure $P_0$.

When the output kiss-point pressure $f_n(I_0)$ is smaller than the measured kiss-point pressure $P_0$, by multiplying the difference between the measured kiss-point pressure $P_0$ and the output kiss-point pressure $f_n(I_0)$ by a reduction coefficient k, which is smaller than 1, and adding this value to the output kiss-point pressure $f_n(I_0)$, the final kiss-point pressure $P_{kp}$ larger than the output kiss-point pressure $f_n(I_0)$ and smaller than the measured kiss-point pressure $P_0$, and a corresponding final kiss-point electric current $I_{kp}$ are obtained to ensure safety in control.

That is, when the measured kiss-point pressure $P_0$ is larger than the output kiss-point pressure $f_n(I_0)$, if control is performed on the basis of the measured kiss-point pressure $P_0$, the engine may be stopped by excessive clutch pressure in shifting from the N-range to the D-range, such that the control should be performed at lower pressure. However, when the control is performed at too low pressure, response is delayed, such that the control should be performed at pressure that is slightly larger than the measured kiss-point electric current $I_0$ and the output kiss-point pressure $f_n(I_0)$ calculated on the basis of the standard data.

It should be understood that the reduction coefficient k may be appropriately selected in a range of 0 to 1, in accordance with the model of a corresponding CVT.

Meanwhile, when the output kiss-point pressure $f_n(I_0)$ is larger than the measured kiss-point pressure $P_0$, the measured kiss-point pressure $P_0$ is determined as the final kiss-point pressure $P_{kp}$ and the measured kiss-point electric current $I_0$ is determined as the final kiss-point electric current $I_{kp}$.

That is, since the output kiss-point pressure $f_n(I_0)$ is larger than the measured kiss-point pressure $P_0$, in consideration of control stability other than response, the measured kiss point pressure $P_0$ smaller than the output kiss-point pressure $f_n(I_0)$ is determined as the final kiss-point pressure $P_{kp}$ and the measured kiss-point electric current $I_0$ is determined as the final kiss-point electric current $I_{kp}$ to perform control.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A teaching method of Transmission Control Unit (TCU) of a vehicle, the method comprising:

measuring specific property data of a transmission;
   inputting the measured specific property data to a one-dimensional barcode;
   attaching the one-dimensional barcode to the transmission; and
   scanning and inputting the specific property data in the one-dimensional barcode to a TCU in a vehicle assembly line;
   wherein identity data for recognizing a corresponding transmission is stored in the one-dimensional barcode, and in the inputting of the specific property data of the transmission to the one-dimensional barcode, the identity data of the transmission is inputted in the one-dimensional barcode and the specific property data of the transmission is inputted in a remaining storage space; and
   wherein the transmission is a Continuously Variable Transmission (CVT) that uses a wet-type multi-disc clutch instead of a torque converter, and is equipped with a solenoid valve directly controlling the wet-type multi-disc clutch, and
   the specific property data of the transmission that is inputted to the one-dimensional barcode includes measured kiss-point pressure and measured kiss-point electric current of the CVT.

2. The teaching method of TCU of a vehicle as defined in claim 1,
   wherein the measured kiss-point pressure and the measured kiss-point electric current are composed of a pair of measured kiss-point pressure and measured kiss-point electric current at the D-range of the CVT and a pair of measured kiss-point pressure and measured kiss-point electric current at the R-range of the CVT.

3. The teaching method of TCU of a vehicle as defined in claim 2,
   wherein reference data about the relationship between the electric current provided to the solenoid valve of the regulated CVT and corresponding pressure exerted in the wet-type multi-disc clutch is inputted in the TCU, and
   the TCU obtains the final kiss-point pressure and the final kiss-point electric current that are used for controlling the CVT to be controlled, by comparing the measured kiss-point pressure and the measured kiss-point electric current, which are received from the one-dimensional barcode, with the standard data of the regulated CVT.

4. The teaching method of TCU of a vehicle as defined in claim 3, wherein the TCU calculates output kiss-point pressure corresponding to the measured kiss-point electric current using the standard data,
   determines, as the final kiss-point pressure of a CVT to be controlled, a value obtained by multiplying the difference between the measured kiss-point pressure and the output kiss-point pressure by a reduction coefficient, which is smaller than 1, and adding the value to the output kiss-point pressure, when the output kiss-point pressure is smaller than the measured kiss-point pressure and determines the output kiss-point electric current corresponding to the final kiss-point pressure as the final kiss-point electric current, using the standard data, and
   determines the measured kiss-point pressure as the final kiss-point pressure and the measured kiss-point electric current as the final kiss-point electric current, when the output kiss-point pressure is larger than the measured kiss-point pressure.

* * * * *